Aug. 26, 1958     E. R. ENGSTRÖM     2,849,259
TRACK PLATE FOR A TRACK-LAYING VEHICLE
Filed May 2, 1955

INVENTOR.
ERIK RAGNAR ENGSTRÖM
BY
ATTORNEY

United States Patent Office 2,849,259
Patented Aug. 26, 1958

2,849,259

TRACK PLATE FOR A TRACK OF A TRACK-LAYING VEHICLE

Erik Ragnar Engström, Bofors, Sweden, assignor to Aktiebolaget Bofors, Bofors, Sweden, a corporation of Sweden Application May 2, 1955, Serial No. 505,454

Claims priority, application Sweden October 1, 1954

3 Claims. (Cl. 305—10)

The present invention relates to improvements in the design of the tracks of track-laying vehicles such as tractors for pulling earth moving equipment and agricultural implements, weapon carriers, etc., and more particularly to the design of the hingedly connected track plates which constitute the running surface of such tracks.

The track plates as herein referred to, are plates from the working face of which a lug also known as grouser protrudes. The grouser extends across the width of the plate transversely to the running direction of the vehicle. Grousers as heretofore known, are of uniform height and thickness. Experience shows that the wear and tear experienced by the grousers are considerably greater near the edges than at the middle portion. Due to such irregular wear, the track plates must be replaced at a time when the middle portion of the grouser, or in other words the major part of the grouser is still high and thick enough to render further service.

Accordingly, one of the objects of the invention is to provide a novel and improved track plate design which greatly extends the useful life of the track plates.

Another object of the invention is to provide a novel and improved track plate, the design of which is such that it compensates for the irregular wear experienced by the grousers during use.

Still another object of the invention is to provide a novel and improved track plate, the grouser of which remains of substantial uniform height during the entire lifetime of the grouser.

Other and further objects, features and advantages of the invention will be pointed out hereinafter and set forth in the appended claims forming part of the application.

In the accompanying drawing, a preferred embodiment of the invention is shown by way of illustration and not by way of limitation.

Figure 4:
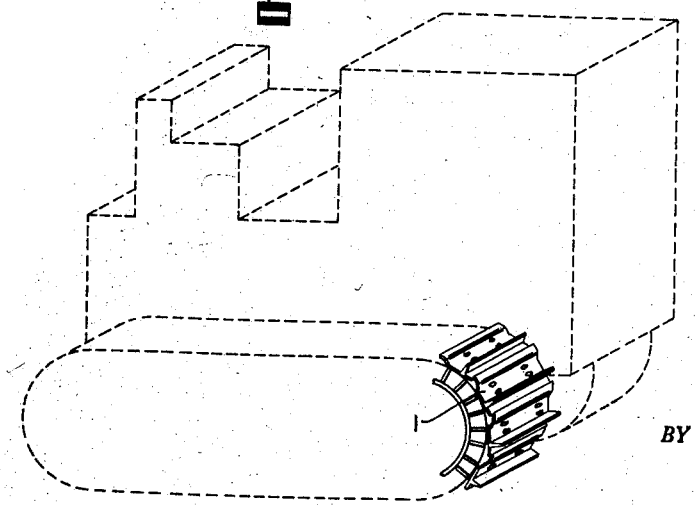
Fig. 4 is a phantom view of a tractor, the tracks of which are formed by track plates according to the invention.

Referring now to the figures in detail, the track plate 1 is of generally conventional design except for the configuration of the grouser, and is mounted in a conventional manner. Fig. 4 illustrates the arrangement of tracks in which track plates according to the invention may be used.

Figure 1:
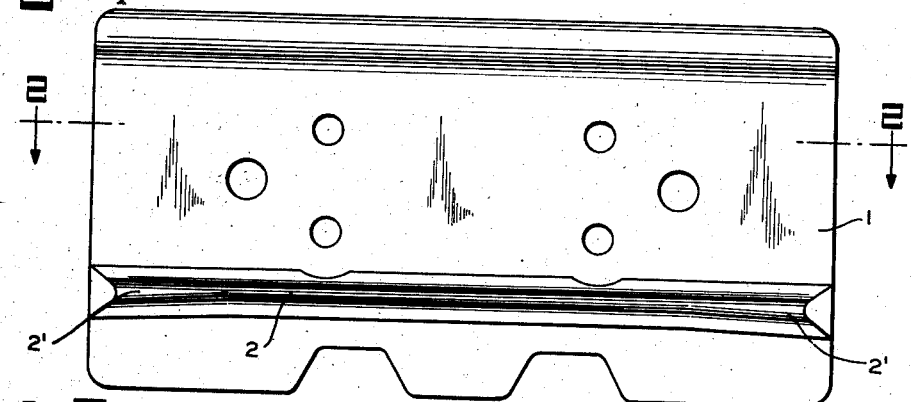
Fig. 1 is a plan view of a track plate according to the invention.
Figure 2:
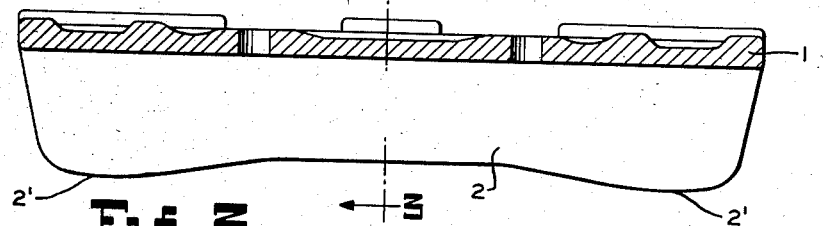
Fig. 2 is a section taken on line 2—2 of Fig. 1.
Figure 3:
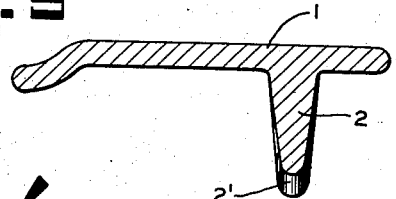
Fig. 3 is a section taken on line 3—3 of Fig. 2.

The grouser 2 extends across the width of the plate transversely to the running direction of the plate when installed in the track. As previously mentioned, grousers of conventional design are of uniform height and width along the entire length of the grouser. In contrast thereto, grousers according to the invention have an enlarged thickness and width at both end portions 2' as can be clearly seen in Figs. 1, 2 and 3. This enlarged width and height compensates for the greater wear experienced by these parts of the grouser so that the entire grouser retains an acceptable uniform height for a considerably longer period of service than a conventional grouser of initially uniform width.

While it is generally preferable to enlarge both, the height and the width, an enlargement of either the height or the width serves to extend the useful life of the grouser to a certain degree.

The plate and its grouser may be produced by drop-forging. Suitable material for the plates and the grouser is an appropriate steel for instance a low-alloyed manganese steel. If desired, the plate and the grouser may be hardened by a suitable heat treatment known for the purpose.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A track plate for the track of a track laying vehicle comprising a grouser extending across the entire width of the working face of the plate and being integral therewith, said grouser having a central portion of uniform width and increasing uniformly in width from said central portion of each opposite end thereof, the maximum width of the grouser being at the outermost ends thereof.

2. A track plate for the track of a track laying vehicle comprising a grouser extending across the entire width of the working face of a plate and being integral therewith, said grouser having a central portion of uniform height and increasing uniformly in height from said central portion to each opposite end thereof, the maximum height of the grouser being at the outermost ends thereof.

3. A track plate for the track of a track laying vehicle comprising a grouser extending across the entire width of the working face of a plate and being integral therewith, said grouser having a central portion of uniform width and height and two outer end portions increasing uniformly in width and height to each opposite end thereof from said central portion, and said grouser being of uniform width and height at the outer ends thereof.

References Cited in the file of this patent

UNITED STATES PATENTS 1,822,132   Davis _____ Sept. 8, 1931

OTHER REFERENCES

"The Development of Track Equipment for Snow and Ice Conditions," Track Shoe No. 16572, p. 5, Grouser Shoe No. 2B8986, p. 10; published by The Caterpillar Tractor Company, Peoria, Illinois, Dec. 4, 1952.